Oct. 25, 1927.  1,646,453
R. B. HITCHCOCK
HARVESTER THRASHER
Filed Feb. 13, 1919  3 Sheets-Sheet 1

Inventor
Rex B. Hitchcock
By: Chas. E. Lord atty.

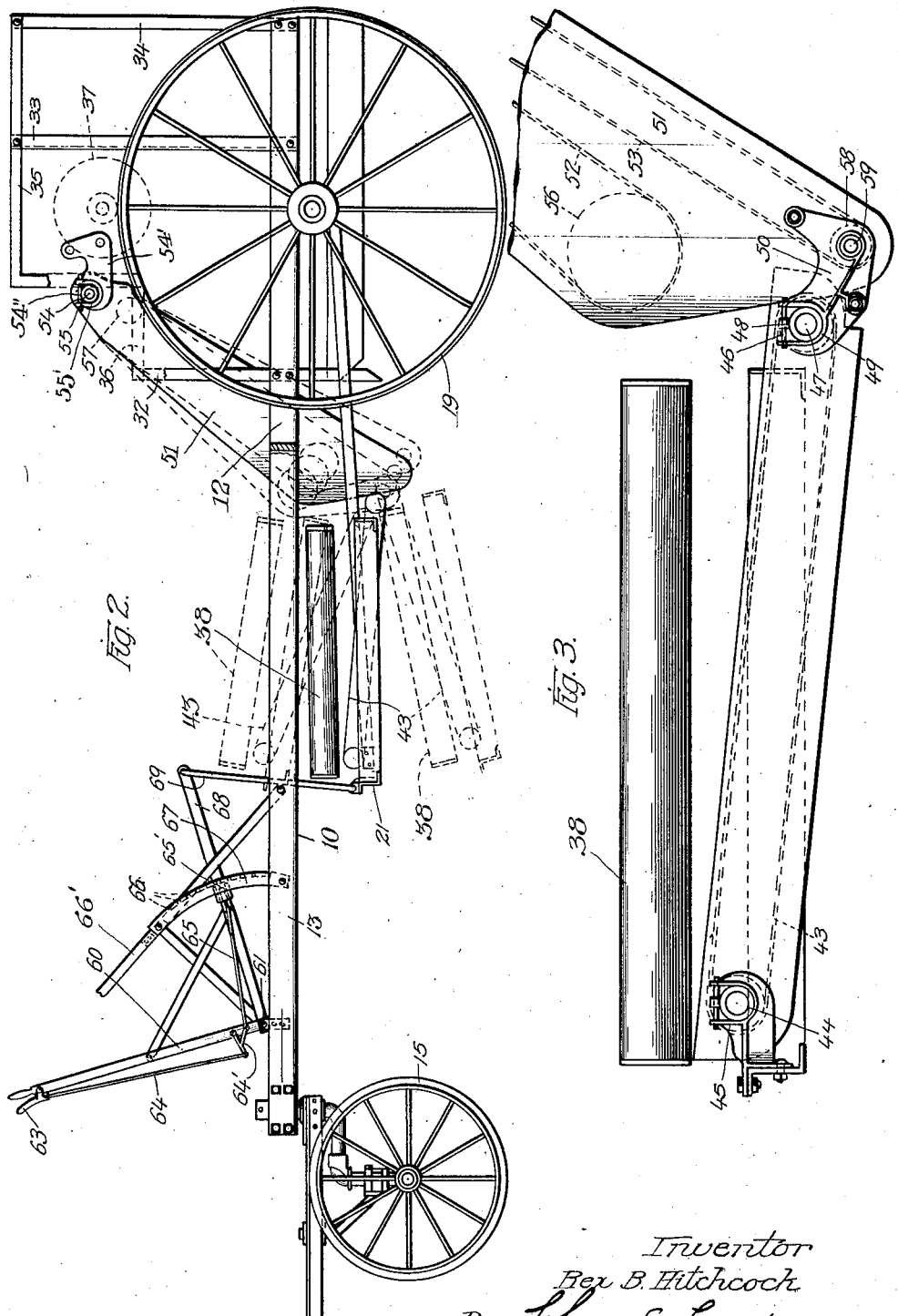

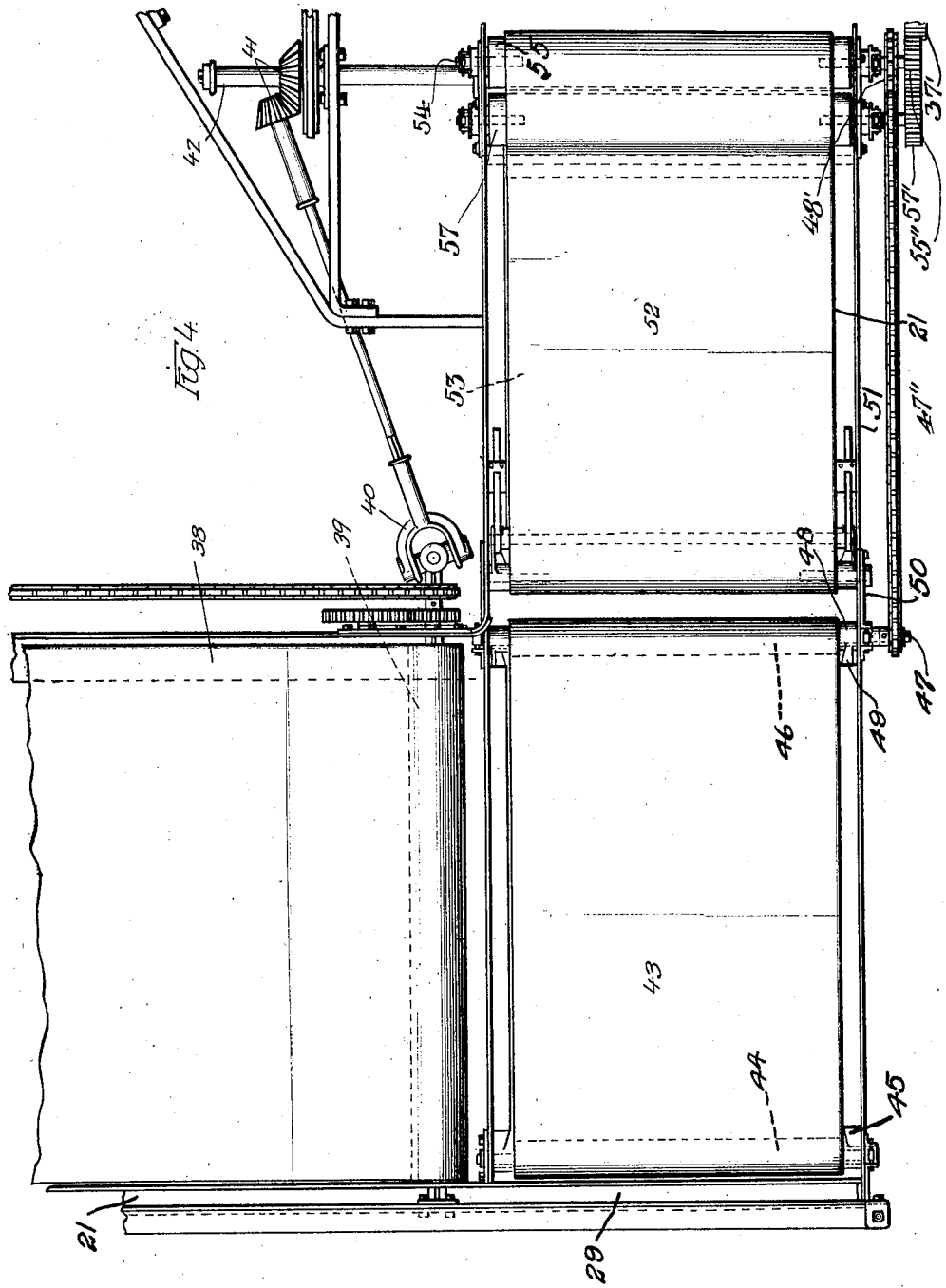

Patented Oct. 25, 1927.

1,646,453

UNITED STATES PATENT OFFICE.

REX B. HITCHCOCK, OF HOOSICK FALLS, NEW YORK, ASSIGNOR TO INTERNATIONAL HARVESTER COMPANY, A CORPORATION OF NEW JERSEY.

HARVESTER THRASHER.

Application filed February 13, 1919. Serial No. 276,708.

This invention relates to harvester thrashers and machines of like character.

In machines of this type, as is well known, the cut grain falls on the platform apron and is conveyed to one end thereof and then is usually carried rearwardly and elevated. In order to enable the operator to control the amount of straw cut, the platform is made vertically adjustable or tiltable, and it is necessary for the successful operation of the machine that the various conveyers, such for instance as the rearwardly moving and elevating conveyers, be maintained in cooperative relationship in all positions of adjustment.

The present invention has for its object, therefore, to provide a construction in which the various conveyers will be always maintained in operative relationship to deliver the grain from one to the other and also in which the conveyers delivering the grain to the thrashing mechanism will always be maintained in such position that the grain will be properly delivered to the thrashing mechanism or other operative elements.

In the construction illustrated the invention has been embodied in a harvester thrasher having the usual platform conveyer and having a cross conveyer at one end of the platform receiving the grain from the platform apron, the cross apron delivering the grain to the elevating conveyers, which in turn deliver it to the thrashing cylinder.

The elevating conveyers are so connected to the frame of the machine that the delivery ends thereof are always maintained in such position that the grain will be delivered to the thrashing mechanism, and the connection between the platform and the elevating conveyers and between the cross conveyer on the platform and the elevating conveyers, is such that the grain will be delivered from one to the other in all positions of adjustment of the platform.

In the drawings, wherein one embodiment of the invention is illustrated,—

Fig. 2 is a side elevation partly in section of the construction shown in Fig. 1;

Fig. 3 is an enlarged detail view showing the pivotal connection between the platform frame and the frame for the elevating conveyers; and Fig. 4 is a detail plan view of the construction shown in Fig. 3.

Figure 1:
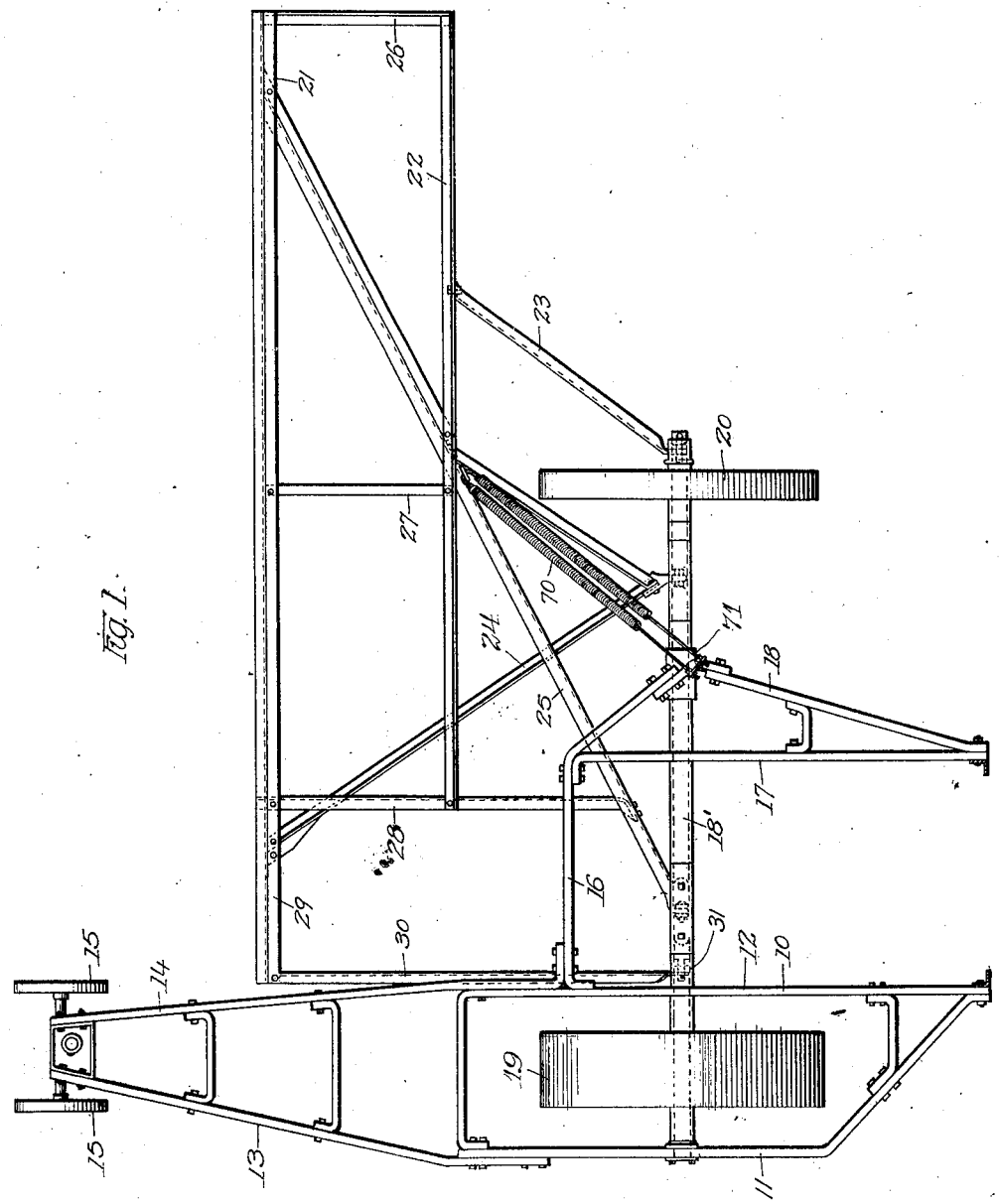
Figure 1 shows a top plan view of the frame of the machine.

Referring first to Figure 1, wherein the frame of the machine is shown, the main frame 10 of the machine comprises longitudinal members 11 and 12 connected at their front ends to forwardly converging truck frame members 13 and 14 which are supported at their front ends by truck wheels 15. The frame member 12 has secured thereto a grainwardly extending frame member 16 which is secured at its opposite end to frame members 17 and 18. The thrashing mechanism and the rear ends of the frame members for the feeding elevators are supported by the rectangular frame formed by the members 12, 16 and 17. The main axle 18' of the machine is supported in suitable journals carried by the longitudinal frame members and is carried by a main wheel 19 and a transport or grain wheel 20. The platform frame is hingedly connected to the main frame or to the axle which forms a part thereof, and comprises the usual transverse platform members 21 and 22, the platform frame formed by these members being pivotally connected to suitable sleeves carried on the main axle by means of members 23, 24 and 25. The platform members 21 and 22 are connected by members 26, 27 and 28 which extend across the platform, the member 28 extending rearwardly and being secured to member 25. The front platform frame member 21 extends stubblewardly from the member 28, as shown at 29, the stubbleward end 29 being pivotally connected by means of a longitudinal bar 30 to a sleeve 31 carried by the main axle.

As illustrated in Figure 1, the frame members 25, 28 and 30 extend underneath the main frame of the machine formed by the members 16 and 17. Referring to Figure 2, it will be seen that the rectangular frame formed by the members 10, 16 and 17 of the main frame of the machine, has secured thereto vertical frame members 32, 33 and 34, the members 33 and 34 being connected at their upper ends by a longitudinal frame member 35, the front end of the member 35 being connected with the upper end of the frame member 32 by an angular frame member 36. The thrashing cylinder shown diagrammatically at 37 is supported in any suitable manner on the frame formed by the vertical frame members just described.

The platform frame formed by the members 21, 22, 26, 27 and 28, carries the usual platform conveyer 38, the delivery end of which is shown in Fig. 4, and extends around a roller 39 which is driven by universal and longitudinally extending shafting 40 geared as shown at 41 to a shaft 42 which is operatively connected in any suitable manner to gearing carried by the main wheel 19 of the machine. This shafting is made longitudinally extensible and also is connected to the roller 39 by means of a universal joint in order that the platform conveyer 38 may be driven in all positions of the adjustment of the platform. The conveyer 38 delivers the grain at its stubbleward end to a cross conveyer 43 supported at its front end by a roller 44 carried by journal boxes 45 secured to the extension 29 of the platform frame member 21. The cross conveyer has its rear end supported by a roller 46 carried by a shaft 47 which in turn is mounted in journal members 48 carried in journal boxes 49 formed at the front end of castings 50 secured to the frame members 51 which support the elevating conveyers 52 and 53 that receive the grain from the cross conveyer and deliver it to the thrashing cylinder 37. The frame members 51 are pivotally mounted on the shaft 54 journaled in the bearings 55', carried by the castings 54' secured to each side of the thrashing cylinder frame, the shaft 54 carrying a roller 55 which supports the upper end of the conveyer 52, the lower end of said conveyer being supported by a roller 56. The conveyer 53 is supported at its upper end by a roller 57 and at its lower end by a roller 58 carried by a shaft 59 journaled in bearings carried by the frame members 51, the shaft 59 extending through the brackets or castings 50. The castings 54' are further provided with open channels to receive the shaft, the latter being held firm from displacement by pins or bolts 54''. By providing these castings 54', as shown, the frame member 51 can be quickly detached from the cylinder frame when access to the thrashing cylinder is required, and as the boxes 45 and castings 50 are constructed in a similar manner it will be seen that the frames carrying the conveyer 43, and the elevating conveyers 52 and 53, can be readily taken off when necessary by merely removing the bolts, and lifting the shafts from the frame out of the open channel. The conveyors 52 and 53 are driven from a gear 37' (only part of which is shown) carried by the thrashing cylinder shaft. This gear drives a pinion 55'' mounted on the shaft 54, having the roller 55 thereon. This pinion co-operates with the pinion 57' secured to the shaft of the roller 57. The cross-conveyor 43 is driven by a sprocket and chain connection 48' and 47'', between the shafts 54 and 47.

Suitable lever mechanism is provided for vertically adjusting the harvester platform, and in the present instance the platform is adjusted by means of a bell crank lever 60 pivoted at 61 to frame member 14, one arm of the bell crank lever carrying a pawl releasing member 63 connected by a link 64, lever 64' and link 65, to a pawl 65' which is adapted to enter any one of a series of apertures 66 formed in a sector 67 suitably supported on the frame member 14 and seat supporting member 66'. The other arm of the bell crank lever is extended as shown at 68, the rear end of the extension 68 being connected by means of a link 69 to the front member 21 of the platform frame.

It will be readily seen that the operator by releasing the pawl 65' and swinging the bell crank lever about its pivot 61 will swing the platform vertically about the pivotal connections of the frame members 23, 24, 25, and 30 on the main axle of the frame.

In order to assist the operator in tilting the platform frame suitable counterbalancing springs 70 are secured at one end to the platform, and at its opposite end to a vertical frame member 71 carried by the main frame of the machine.

A brief description of the operation of the construction above described will now be given, and for a clear understanding of the construction and operation it should be borne in mind that a portion of the frame of the machine is rigidly mounted, and a portion of the frame is tiltably mounted, the platform frame being tiltable as above described.

When the operator desires to adjust the platform frame in order to cut more or less straw, the bell crank lever 60 is swung about its pivot and the platform is swung on the frame members 23, 24, 25 and 30. As the platform frame is so adjusted the elevator frame members 51 will swing on the pivot 54 carried by the main frame, and the cross conveyer 43 will swing on the pivot 47 formed on the castings 50 secured to the frame members 51, and on the forward pivot 44 formed on the casting 45. Thus it will be seen that there is a jack-knife action between the elevating conveyers and the cross conveyer, the delivery end of the cross conveyer which is supported on the pivot 47 being always maintained in cooperative relation with the receiving end of the conveyers 52 and 53. It will also be seen that the delivery ends of the conveyers 52 and 53 are always maintained in such a position that these conveyers will deliver the grain to the thrashing cylinder 37.

In Figure 2 I have shown in dotted lines the various positions of the frame members 51, the platform frame and the cross conveyer, and in each of these positions it will be seen that the position of the delivery end of the cross conveyer with respect to the elevating conveyers is not changed.

While I have in the above specification described one embodiment of my invention, it should be understood that the invention is capable of modification, and that modifications may be made without departing from the spirit and scope of the invention as expressed in the following claims.

I claim:

1. In a harvester thrasher, a main frame, a thrasher thereon, a vertically adjustable platform pivoted to said frame, a conveyer thereon, an elevator frame pivoted to said thrasher, a conveyer therefor, and a conveyer pivotally connected to the platform and elevator frame, whereby a cooperative relationship between the delivery end of the platform conveyer and the last mentioned conveyer will be maintained in all positions of adjustment of said platform.

2. In a harvester thrasher, a main frame, a thrasher thereon, a vertically adjustable platform carried by the frame and having a longitudinally extending conveyer thereon, a cross conveyer carried by said platform and receiving grain from the platform conveyer, and an elevator including a conveyer receiving grain from the cross conveyer and discharging into the thrasher, said cross conveyer being pivotally connected to said platform and to the elevator.

3. In a harvester, an adjustable platform, a conveyer mounted in said platform, a cross-conveyer, an elevator conveyer, and means for adjusting all of said conveyers with respect to each other when said platform is adjusted.

4. In a harvester, an adjustable platform, a conveyer mounted in said platform, a cross-conveyer, an elevator conveyer, and pivotal connections between each conveyer for permitting adjustment of all of said conveyers in co-operative relation with respect to each other when said platform is adjusted.

5. In a harvester, an adjustable platform, a conveyer mounted in said platform, a cross-conveyer mounted for pivotal adjustment with respect to said platform, an elevator conveyer, and means for adjusting all of said conveyers when said platform is adjusted.

6. In a harvester thrasher, a main frame, a thrasher thereon, an adjustable platform carried by the frame, a conveyer on the platform, a cross conveyer pivoted to the platform, an elevator frame including a conveyer pivoted to the cross conveyer and to the thrasher, and means for adjusting all of said conveyers with respect to each other.

In testimony whereof I affix my signature.

REX B. HITCHCOCK.